(12) United States Patent
Maffezzoni

(10) Patent No.: US 6,901,493 B1
(45) Date of Patent: May 31, 2005

(54) METHOD FOR PROTECTING DATA OF A COMPUTER SYSTEM

(75) Inventor: Guido Maffezzoni, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 791 days.

(21) Appl. No.: 09/566,910

(22) Filed: May 9, 2000

Related U.S. Application Data

(63) Continuation-in-part of application No. 09/256,687, filed on Feb. 23, 1999, now Pat. No. 6,532,535, which is a continuation-in-part of application No. 09/110,783, filed on Jul. 6, 1998, now Pat. No. 6,205,527.
(60) Provisional application No. 60/075,687, filed on Feb. 24, 1998.

(51) Int. Cl.[7] .............................................. G06F 12/00
(52) U.S. Cl. ..................... 711/162; 711/161; 707/204
(58) Field of Search .................. 711/161–162, 114; 714/6, 20; 707/204

(56) References Cited

U.S. PATENT DOCUMENTS

| | | | | |
|---|---|---|---|---|
| 5,276,865 A | * | 1/1994 | Thorpe | 714/24 |
| 5,708,776 A | * | 1/1998 | Kikinis | 714/55 |
| 5,713,024 A | * | 1/1998 | Halladay | 717/11 |
| 5,799,141 A | * | 8/1998 | Galipeau et al. | 714/13 |
| 5,907,672 A | * | 5/1999 | Matze et al. | 714/8 |
| 5,924,102 A | * | 7/1999 | Perks | 707/200 |
| 6,035,412 A | * | 3/2000 | Tamer et al. | 714/6 |
| 6,041,395 A | * | 3/2000 | Beelitz | 711/173 |
| 6,175,904 B1 | * | 1/2001 | Gunderson | 711/162 |

* cited by examiner

Primary Examiner—Nasser Moazzami
(74) Attorney, Agent, or Firm—Martine Penilla & Gencarella, LLP

(57) ABSTRACT

In a method for protecting data of a computer system having a hard drive with an operating system stored on a first partition thereof, the operating system is copied from the first partition of the hard drive to a second partition of the hard drive and selected data is copied from the hard drive to a backup location. Thereafter, if a crash that prevents the computer system from booting from the operating system stored on the first partition of the hard drive occurs, then the computer system is booted from the copy of the operating system stored on the second partition of the hard drive. Next, if the selected data needs to be restored back to the hard drive, then the backup location to which the selected data was copied is accessed and the selected data is restored back to the hard drive. In one embodiment, the backup location is a storage resource connected to the Internet.

10 Claims, 5 Drawing Sheets

US 6,901,493 B1

METHOD FOR PROTECTING DATA OF A COMPUTER SYSTEM

CLAIM OF PRIORITY

This application is a continuation-in-part of, and claims priority under 35 U.S.C. § 120 from, U.S. patent application Ser. No. 09/256,687, filed Feb. 23, 1999, now U.S. Pat. No. 6,532,535 entitled "Method for Managing Primary and Secondary Storage Devices in an Intelligent Backup and Restoring System," which is a continuation-in-part of U.S. patent application Ser. No. 09/110,783, filed Jul. 6, 1998, now U.S. Pat. No. 6,205,527 entitled "An Intelligent Backup And Restoring System And Method For Implementing The Same." The disclosures of these pending applications are incorporated herein by reference for all purposes. This application also claims the benefit of Provisional Application No. 60/075,687 filed Feb. 24, 1998.

CROSS REFERENCE TO RELATED APPLICATIONS

This application is related to the following applications: (1) U.S. patent application Ser. No. 09/256,680, filed on Feb. 23, 1999, and entitled "Method of Finding Application Components in an Intelligent Backup and Restoring System"; (2) U.S. patent application Ser. No. 09/256,676, filed on Feb. 23, 1999, and entitled "Method of Generating A Database for use in an Intelligent Backup and Restoring System"; (3) U.S. patent application Ser. No. 09/256,686, filed on Feb. 23, 1999, and entitled "Method for Generating a Footprint Image File for an Intelligent Backup and Restoring System"; (4) U.S. patent application Ser. No. 09/256,682, filed on Feb. 23, 1999, and entitled "Automated Drive Repair Systems and Methods"; (5) U.S. patent application Ser. No. 09/256,601, filed on Feb. 23, 1999, and entitled "Drive Preparation Methods for Intelligent Backup Systems"; (6) U.S. patent application Ser. No. 09/568,564, filed on the same day as the subject application, and entitled "Method for Creating Partition on the Fly"; and (7) U.S. patent application Ser. No. 09/568,087, filed on the same day as the subject application and entitled "Methods for Selecting a Boot Partition and Hiding a Non-Selected Partition." The disclosures of each of these related applications are incorporated herein by reference.

BACKGROUND OF THE INVENTION

The present invention relates generally to computer backup systems and, more particularly, to a method for protecting data of a computer system having a hard drive with an operating system stored on a first partition thereof.

Computer systems commonly have a hard disk drive on which an operating system (OS) is stored. As is well known to those skilled in the art, the OS provides the necessary functionality to enable processing of basic computer routines as well as render software applications with specific OS functionality. Although the OS is designed to be robust, many times errors occur that cause the OS to stop functioning as intended. This type of problem is often referred to as a computer crash, and the computer crash can be the result of any number of causes. Such causes include, for example, computer viruses, miscommunication between programs, improper shutdowns, power surges, etc. In any event, when a crash occurs, the computer system may not be able to reboot from the resident OS.

At present, when a crash occurs, the computer user is generally required to obtain professional help to diagnose the problem and formulate a solution. Because computer users often store valuable information on their drive, users are routinely forced to endure many hours of downtime until the drive is repaired and data is recovered (assuming a prior backup was recent enough to be helpful).

In view of the foregoing, there is a need for a method that enables a computer system to remain operational from the same hard disk drive while any necessary repairs are made to the original OS.

SUMMARY OF THE INVENTION

Broadly speaking, the present invention fills this need by providing a method for protecting data of a computer system that enables a user to continue working from the same drive when a crash occurs.

In accordance with one aspect of the present invention, a method for protecting data of a computer system having a hard drive with an operating system stored on a first partition thereof is provided. In this method, the operating system is copied from the first partition of the hard drive to a second partition of the hard drive and selected data from the hard drive is copied to a backup location. Thereafter, if a crash that prevents the computer system from booting from the operating system stored on the first partition of the hard drive occurs, then the computer system is booted from the copy of the operating system stored on the second partition of the hard drive. Next, if the selected data needs to be restored back to the hard drive, then the backup location to which the selected data was copied is accessed and the selected data is restored back to the hard drive.

In one embodiment, the second partition of the hard drive is hidden from a user of the computer system. By way of example, the selected data copied from the hard drive for backup may include application files and user data files. By way of example, the selected data copied for backup may be copied from at least one of the first partition of the hard drive and a third partition of the hard drive. In one embodiment, a drive letter of the first partition of the hard drive is C: and a drive letter of the third partition of the hard drive is D:. In one embodiment, the selected data includes all data stored on the first and third partitions of the hard drive.

In one embodiment, the backup location is a storage resource connected to the Internet. By way of example, the storage resource connected to the Internet may be a networked hard drive, a storage area network, a RAID array, or cluster server storage. In another embodiment, the backup location is the second partition of the hard drive. In yet another embodiment, the hard drive of the computer system is a first hard drive, and the backup location is one or more of a second hard drive, a Zip® drive, a Jaz® drive, a CD-R drive, a CD-RW drive, a DVD-RW drive, a magneto-optical drive, a networked drive, a jukebox, and a tape drive.

In one embodiment, the operation of accessing the backup location to which the selected data was copied and restoring the selected data back to the hard drive includes the operations of calling a table of contents to determine the backup location of the selected data, accessing the backup location having the selected data, and restoring the selected data back to the hard drive.

In accordance with another aspect of the present invention, a computer readable media containing program instructions for protecting data of a computer system having a hard drive with an operating system stored on a first partition thereof is provided. The computer readable media includes program instructions for copying the operating system from the first partition of the hard drive to a second partition of the hard drive and copying selected data from the hard drive to a backup location. The computer readable media also includes program instructions for booting the computer system from the copy of the operating system stored on the second partition of the hard drive if a crash that prevents the computer system from booting from the operating system stored on the first partition of the hard drive occurs. The computer readable media further includes program instructions for accessing the backup location to which the selected data was copied and restoring the selected data back to the hard drive if the selected data needs to be restored back to the hard drive.

The method for protecting data of a computer system of the present invention advantageously enables the user of the computer system to implement a backup system using only a single hard disk drive. Accordingly, the method of the present invention is well suited for implementation on laptop personal computer (PC) systems. By enabling the user to keep working from the same drive with only a brief interruption when a crash occurs, the method of the invention significantly increases the user's efficiency in completing tasks on the computer system.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE INVENTION

Several exemplary embodiments of the invention will now be described in detail with reference to the accompanying drawings.

The present invention provides a method for protecting data of a computer system that may be implemented using a single hard disk drive ("hard drive"). As will be explained in more detail below, the method involves copying the operating system stored on one partition of the hard drive to another partition of the hard drive. Selected data, e.g., application files and user data files, is copied from the hard drive to a backup location, which, at the option of the user, may be either the same partition of the hard drive to which the operating system was copied or a remote location, e.g., a storage resource connected to the Internet or a second hard drive. In the event a crash occurs that prevents the computer system from booting from the original operating system, the computer system may be booted from the copy of the operating system. If the selected data needs to be restored back to the hard drive, then the backup location to which the selected data was copied is accessed and the selected data is restored back to the hard drive.

Figure 1A:
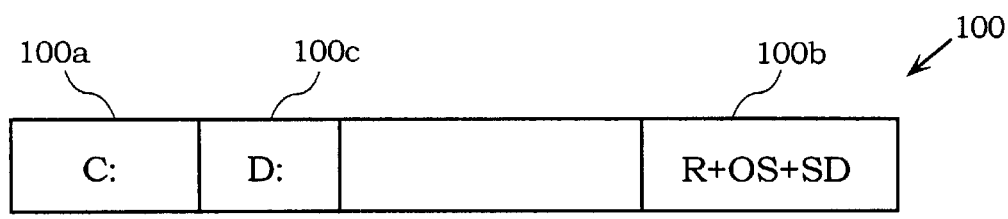
FIG. 1A is a schematic diagram of hard drive of a computer system in accordance with one embodiment of the invention.

FIG. 1A is a schematic diagram of hard drive 100 of a computer system in accordance with one embodiment of the invention. By way of example, the computer system may be a personal computer (PC) system such as a desktop computer or a laptop computer. As shown in FIG. 1A, hard drive 100 includes first partition 100a, second partition 100b, and third partition 100c. First partition 100a is labeled as the C: drive, which is usually the primary drive of a PC system on which the operating system, application files, and user data files are stored. Second partition 100b is a backup partition on which the backup system software (R), a copy of the operating system (OS), and copies of selected data (SD) from the hard drive are stored, as will be described in more detail later. Third partition 100c, which is labeled as the D: drive, also may have data, e.g., application files and user data files, stored thereon.

Figure 1B:
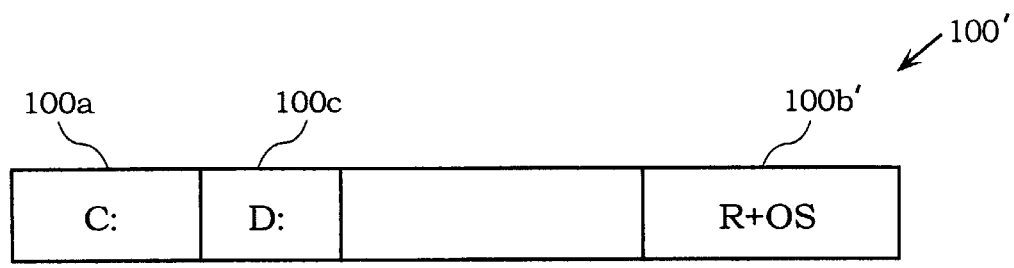
FIG. 1B is a schematic diagram of hard drive of a computer system in accordance with another embodiment of the invention.

FIG. 1B is a schematic diagram of hard drive 100' of a computer system in accordance with another embodiment of the invention. As shown therein, hard drive 100' includes first partition 100a, second partition 100b', and third partition 100c. First partition 100a and third partition 100c of hard drive 100' are the same as described above with reference to FIG. 1A. Second partition 100b' is a backup partition on which the backup system software (R) and a copy of the operating system (OS) are stored, as will be described in more detail later. In this embodiment the backup location to which copies of selected data, e.g., application files and user data files, are copied is a remote location, e.g., a storage resource connected to the Internet or a second hard drive. It will be apparent to those skilled in the art that the drive letters assigned to the partitions may be varied from those shown in FIGS. 1A and 1B.

Figure 2:
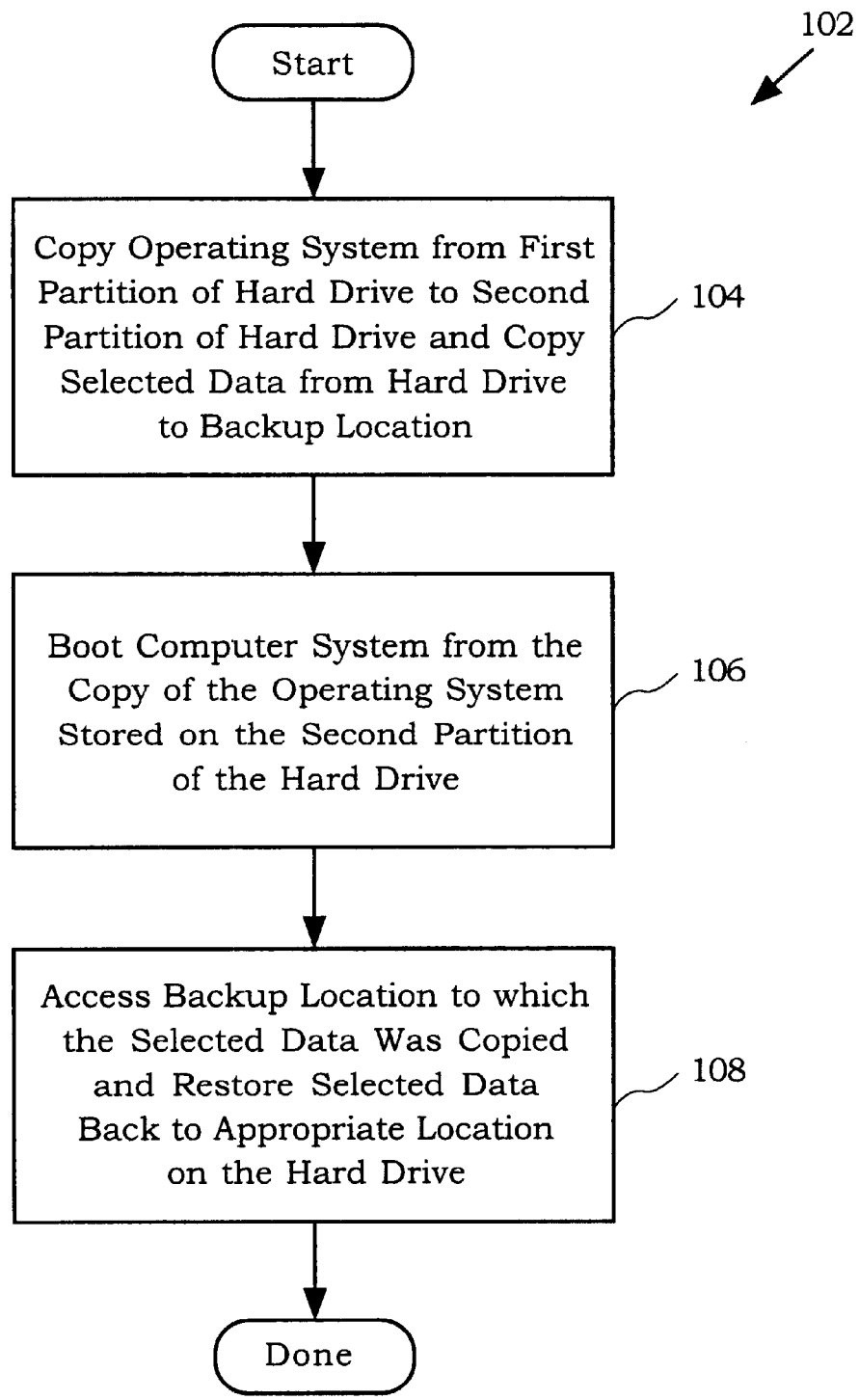
FIG. 2 is a flowchart diagram illustrating the method operations performed in protecting data of a computer system having a hard drive with an operating system stored on a first partition thereof in accordance with one embodiment of the invention.

FIG. 2 is a flowchart diagram 102 illustrating the method operations performed in protecting data of a computer system having a hard drive with an operating system stored on a first partition thereof in accordance with one embodiment of the invention. The method begins in operation 104 in which the operating system is copied from the first partition of the hard drive to the second partition of the hard drive and selected data is copied from the hard drive to a backup location. It will be apparent to those skilled in the art that suitable backup system software having the functionality required to perform such copying must be loaded on the computer system to enable operation 104 to be carried out. The backup system described in the related applications listed above has the requisite functionality. This backup system, which is referred to in the related applications listed above as the "Genesis" backup system, is now commercially available from Adaptec, Inc. of Milpitas, Calif. under the trade designation "ReZOOM." In one embodiment, the backup system is first loaded onto the first partition of the hard drive, e.g., the C: drive, and then copied to the second partition of the hard drive. During operation of the computer system, the backup system runs in the background on the first partition of the hard drive, e.g., the C: drive.

Before execution of operation 104, the user of the computer system may be prompted to select data on the hard drive for backup and to select a backup location for the selected data. Once the data to be backed up and the backup location are selected, the backup system copies the operating system to the second partition of the hard drive and copies the selected data from the hard drive to the selected backup location. The operating system may be any well-known operating system, e.g., Windows (2000, 98, 95, NT, etc.), Apple Mac OS (X, 9, 8, etc.), Unix, and Linux. By way of example, the selected data may include application files, e.g., Microsoft Word, Microsoft Excel, etc., and user data files, e.g., Word documents, Excel spreadsheets, etc.

The backup location to which the selected data is copied from the hard drive may be either the second partition of the hard drive to which the operating system was copied or a location remote from the hard drive. By way of example, suitable remote locations include a second hard drive, a Zip® drive, a Jaz® drive, a CD-R drive, a CD-RW drive, a DVD-RW drive, a magneto-optical drive, a networked drive, a jukebox, a tape drive, and a storage resource connected to the Internet. Zip® and Jaz® drives are commercially available from Iomega Corporation of Roy, Utah. If the backup location has a relatively small storage capacity, e.g., a Zip® drive, a CD-R drive, or a CD-RW drive, then it may be desirable to compress the selected data before copying it to the backup location. By way of example, the networked drive may be a hard drive connected to an intranet, a local area network (LAN), or a wide area network (WAN). By way of example, the storage resource connected to the Internet may be a networked hard drive, a storage area network (SAN), a RAID array, or cluster server storage. If the backup location is accessible via a network, e.g., a networked drive or a storage resource connected to the Internet, then it may be desirable to encrypt the selected data before copying it to the backup location. The functionality required to compress and encrypt the selected data may be built in to the backup system.

After the operating system has been copied to the second partition of the hard drive and the selected data has been copied to the backup location, the user of the computer system may use the computer system in normal operation with the backup system running in the background. If a logical crash occurs that prevents the computer system from booting from the operating system stored on the first partition of the hard drive, then the method proceeds to operation 106. If a physical crash occurs, then the hard drive must be repaired or replaced. Once the hard drive is repaired or replaced, certain physical crash restoration operations, which are described in detail below, may be performed.

In operation 106, the computer system is booted from the copy of the operation stored on the second partition of the hard drive. Once the computer system is booted in this manner, the hard drive is examined to determine whether any of the selected data copied from the hard drive needs to be restored back to the hard drive. In one embodiment, this is accomplished by accessing the backup location and then comparing the content of the backup location to that of the hard drive. If any of the selected data needs to be restored back to the hard drive, then the method proceeds to operation 108. In operation 108, the backup location to which the selected data was copied is accessed and the selected data is restored back to the appropriate location on the hard drive. Operation 108 may be performed either automatically or at the request of the user. Depending upon the backup location, either the second partition of the hard drive or the remote location is accessed and the selected data is restored back to the appropriate location of the hard drive, e.g., the C: drive or the D: drive. Once the selected data is restored back to the appropriate location on the hard drive, the method is done.

Figure 3:
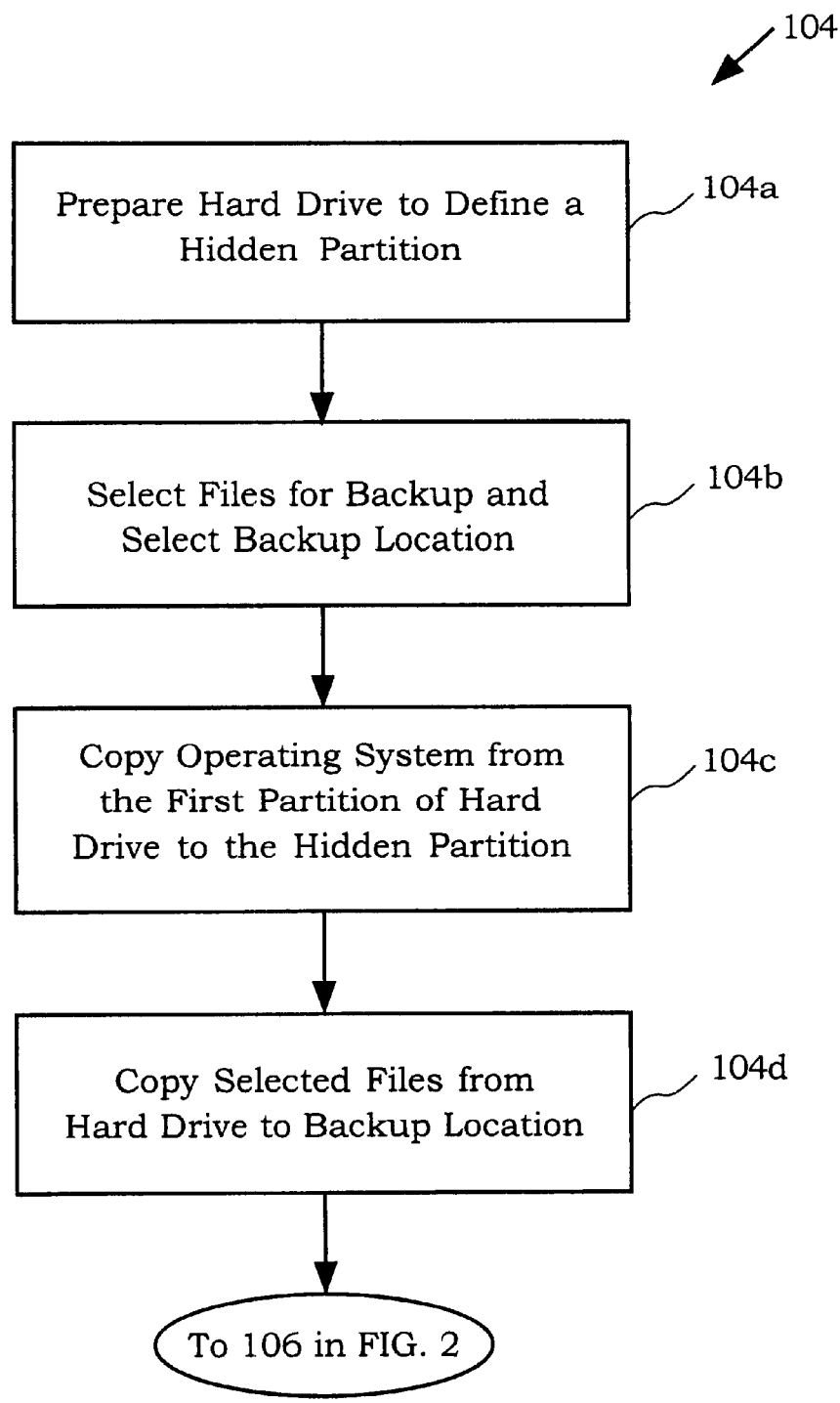
FIG. 3 is a flowchart diagram illustrating in more detail the method operations performed in operation 104 shown in FIG. 2 in accordance with one embodiment of the invention.

FIG. 3 is a flowchart diagram 104 illustrating in more detail the method operations performed in operation 104 shown in FIG. 2 in accordance with one embodiment of the invention. In operation 104a, the hard drive is prepared to define a second partition that is hidden from a user of the computer system. This hidden partition is used to store a guaranteed working copy of the operating system and, if desired, selected data for backup, as described below. The second partition on which the backup copy of the operating system is stored is preferably hidden from the user of the computer system to prevent the user from accidentally deleting important OS files that may cause startup failure. The functionality required to define a hidden partition of the hard drive may be built in to the backup system. One method for preparing a hard drive to define a hidden partition is described in U.S. patent application Ser. No. 09/568,087, filed on the same day as the subject application and entitled "Methods for Selecting a Boot Partition and Hiding a Non-Selected Partition." The disclosure of this application, which is assigned to Adaptec, Inc., the assignee of the subject application, is incorporated herein by reference.

Once the hidden partition is defined, the method proceeds to operation 104b in which the files to be backed up are selected and the backup location is selected. To enable a user to select the files to be backed up and the backup location for the selected files, an appropriate selection window may be displayed. In one embodiment, each item shown in the selection window has a corresponding graphic object, e.g., a check box or a radio button, displayed proximate thereto and a desired item may be selected by clicking on the corresponding graphic object. If desired, the files selected for backup may include all files stored on the hard drive. In one embodiment, the files selected for backup include all files stored on the first and third partitions of the hard drive, e.g., the C: and D: drives, respectively.

After the files to be backed up and the backup location for the selected files have been selected, the method proceeds to operation 104c in which the operating system is copied from the first partition of the hard drive to the hidden partition. In one embodiment, the operating system is copied from the C: drive to the hidden partition. Next, in operation 104d, the selected files are copied from the hard drive to the selected backup location. The selected files may be copied from any partition of the hard drive, e.g., the C: drive, the D: drive, etc. In one embodiment, the selected backup location is the hidden partition. In another embodiment, the selected backup location is a remote location as described above. Once operation 104d is complete, the method proceeds to operation 106 (see FIG. 2).

Figure 4:
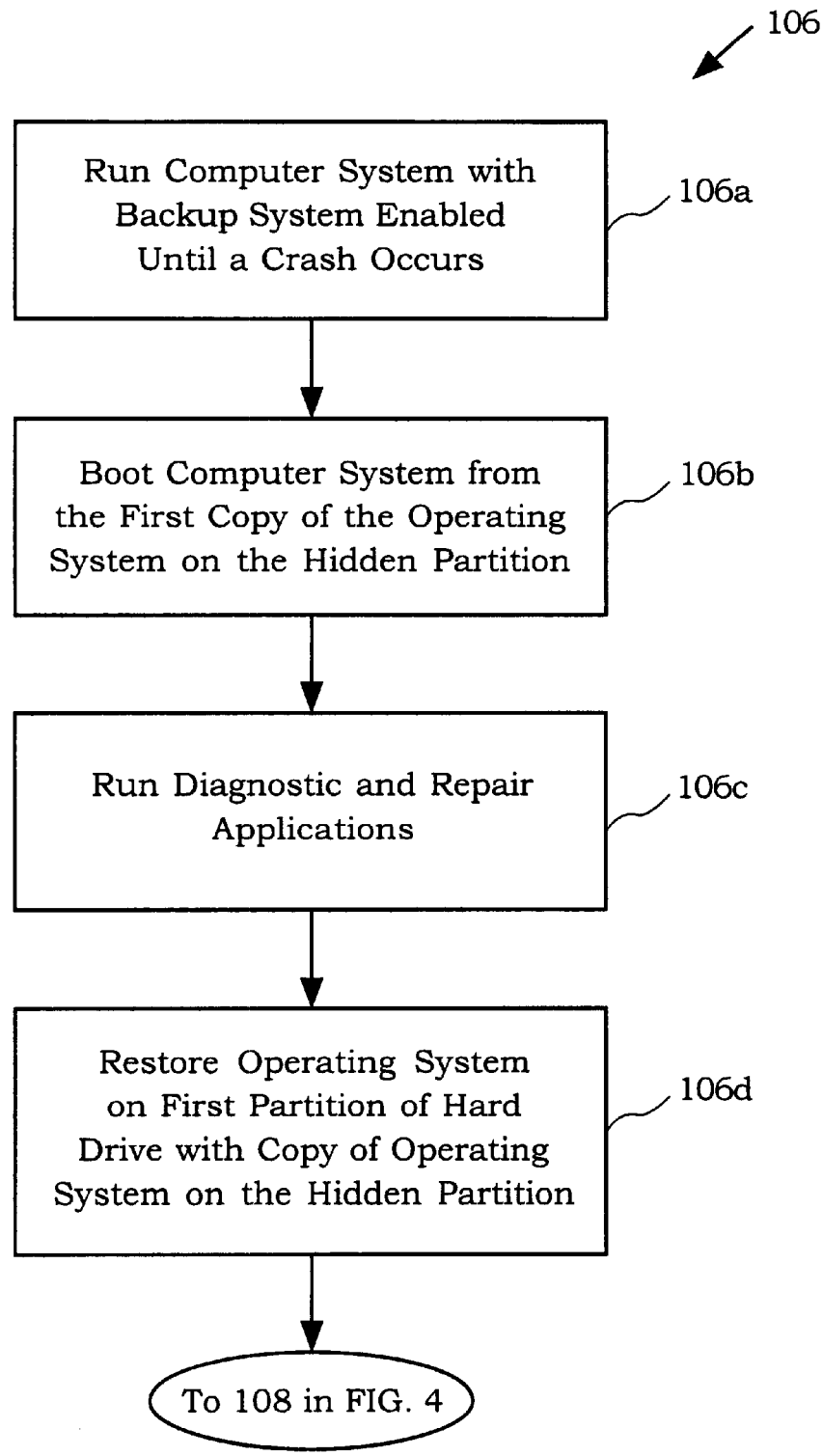
FIG. 4 is a flowchart diagram illustrating in more detail the method operations performed in operation 106 shown in FIG. 2 in accordance with one embodiment of the invention.

FIG. 4 is a flowchart diagram 106 illustrating in more detail the method operations performed in operation 106 shown in FIG. 2 in accordance with one embodiment of the invention. In operation 106a, a user runs the computer system with the backup system enabled until a crash occurs. If the crash is a logical crash that prevents the computer system from booting from the operating system stored on the first partition of the hard drive, then the method proceeds to operation 106b. As noted above, if the crash is a physical crash, then the hard drive must be repaired or replaced and certain physical crash restoration operations, which are described in detail below, may be performed once the hard drive has been repaired or replaced. In operation 106b, the computer system is booted from the copy of the operating system on the hidden partition. Next, in operation 106c, diagnostic and repair applications are run in an effort to fix the problem on the first partition of the hard drive. The diagnostic and repair applications, which are described in more detail in the related applications listed above and may be built in to the backup system, are capable of fixing many common problems that would prevent the computer system from booting from the operating system on the first partition of the hard drive, e.g., the C: drive. For example, the diagnostic and repair applications can fix missing or damaged operating system (OS) files, file allocation table (FAT) or registry corruption, bad boot blocks and partition tables, and virus-related problems.

Next, in operation 106d, the operating system stored on the first partition of the hard drive is restored with the copy of the operating system stored on the hidden partition. The details of this restoring operation will vary depending on the nature of the problem on the first partition of the hard drive. By way of example, if the diagnostic and repair applications determine that certain OS files are missing or damaged, then these OS files may be copied from the hidden partition to the first partition to restore the operating system stored thereon. If the diagnostic and repair applications cannot fix the problem, however; then it may be necessary to reformat the first partition of the hard drive and copy the entire operating system from the hidden partition back to the first partition of the hard drive. Once operation 106d is complete, then the method proceeds to operation 108 (see FIG. 2).

Figure 5:
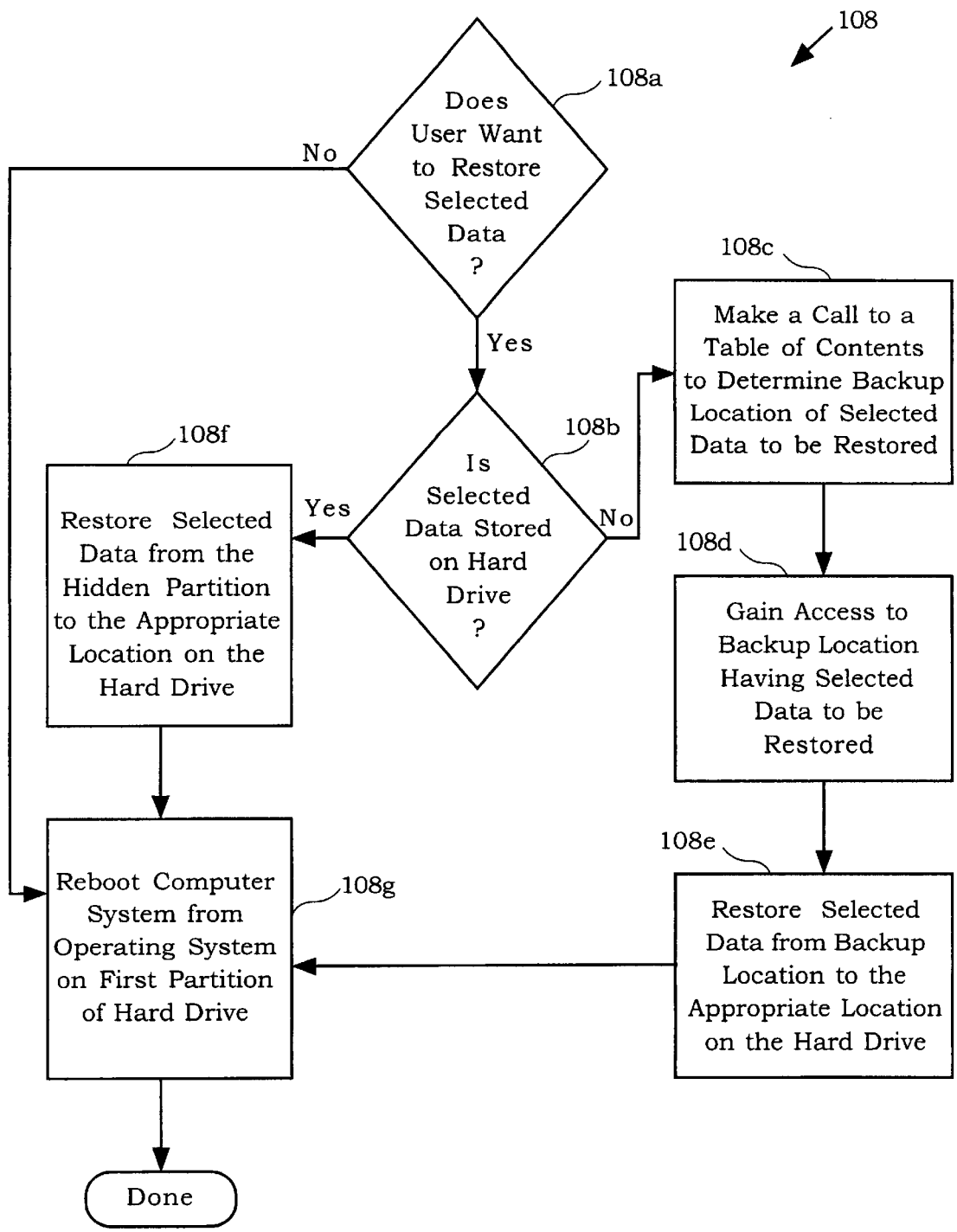
FIG. 5 is a flowchart diagram illustrating in more detail the method operations performed in operation 108 shown in FIG. 2 in accordance with one embodiment of the invention.

FIG. 5 is a flowchart diagram 108 illustrating in more detail the method operations performed in operation 108 shown in FIG. 2 in accordance with one embodiment of the invention. In decision operation 108a, it is determined whether the user wants to restore the selected data back to the appropriate location on the hard drive. This determination may be implemented by displaying an appropriate graphical user interface, e.g., a dialog box, to the user. If the user does not want to restore the selected data, then the method proceeds to operation 108g, which is described below. On the other hand, if the user wants to restore the selected data, then the method proceeds to decision operation 108b. In decision operation 108b, it is determined whether the selected data is stored on the hidden partition of the hard drive. If the selected data is stored on the hidden partition, then the method proceeds to operation 108f in which the selected data is restored from the hidden partition back to the appropriate location on the hard drive. Thereafter, the method proceeds to operation 108g, which is described below.

If the selected data is not stored on the hidden partition, then the method proceeds to operation 108c. In operation 108c, a call is made to a table of contents to determine the backup location of the selected data to be restored back to the appropriate location on the hard drive. The table of contents may be compiled during the operation in which the selected data is copied from the hard drive to the backup location. Those skilled in the art are familiar with suitable techniques for compiling the table of contents. Next, in operation 108d, access to the backup location having the selected data to be restored is gained. If the backup location is directly connected to the computer system, e.g., a second hard drive, a Zip® drive, a Jaz® drive, a CD-R drive, a CD-RW drive, a DVD-RW drive, a magneto-optical drive, or a tape drive, then such backup location may be directly accessed. If the backup location is not directly connected to the computer system, e.g., a networked drive or a storage resource connected to the Internet, then such backup location may be accessed via a LAN, a WAN, an intranet, or the Internet.

Once access to the backup location is gained, the method proceeds to operation 108e in which the selected data is restored from the backup location to the appropriate location on the hard drive. Depending upon the state in which the selected data is stored at the backup location, it may be necessary to uncompress or decrypt the selected data before copying it to the appropriate location on the hard drive. The functionality required to uncompress and decrypt the selected data may be built in to the backup system. Next, in operation 108g, the computer system is rebooted from the operating system on the first partition of the hard drive. Once the computer system is rebooted, the method is done and the user of the computer system may use the computer system in normal operation with the backup system running in the background.

If desired, more than one backup location may be used to store the selected data copied from the hard drive. By way of example, some of the selected data may be stored on the second partition of the hard drive and some of the selected data may be stored on a storage resource connected to the Internet. Alternatively, some of the selected data may be stored on another drive, e.g., a second hard drive, a CD-R/W drive, etc., and some of the selected data may be stored on a storage resource connected to the Internet. It will be apparent to those skilled in the art that use of the second partition of the hard drive as the backup location may result in data loss in the event of a physical crash. Accordingly, the second partition of the hard drive should be used as the backup location for the selected data only if such risk of loss can be tolerated.

As described above, in the event of a physical crash, certain physical crash restoration operations may be performed once the hard drive has been repaired or replaced. In one embodiment, the OS is first reinstalled on the new, i.e., repaired or replaced, drive. Next, the backup application, e.g., the "ReZOOM" backup system, is installed on the drive. Once the backup application is installed, the user can access the remote backup location 1) to update the just-installed OS to the version/configuration that was in place just before the crash, and 2) to retrieve all the data, e.g., applications and user data files, previously stored at the remote backup location. In another embodiment, the new drive is first started under DOS and then, using a specific DOS program, the remote backup location is accessed to retrieve, among other data, the backup copy of the OS, applications, and user data files. This retrieval method is somewhat more difficult to use than the previously-described method, especially when the remote backup location is a storage location that must be accessed through an Internet Service Provider, but may be useful in certain situations because it does not require the user to install any applications to perform the physical crash restoration operations.

The method of the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, or otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium hard disk drives, removal media, read-only memory, random-access memory, CD-ROMs, CD-Rs, CD-RWs, magnetic tapes, and other data storage devices. The computer readable medium can also be distributed over network coupled computer systems so that the computer readable code is stored and executed in a distributed fashion.

In summary, the present invention provides a method for protecting data of a computer system that may be implemented using a single hard disk drive. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

What is claimed is:

1. A method for protecting data of a computer system having a hard drive with an operating system stored on a first partition thereof, comprising:

Copying the operating system from the first partition of the hard drive to a second partition of the hard drive and copying selected data from the hard drive to a storage resource connected to the Internet, wherein the second partition of the hard drive is hidden from a user of the computer system;

If a crash that prevents the computer system from booting from the operating system stored on the first partition of the hard drive occurs, booting the computer system from the cony of the operating system stored on the second partition of the hard drive; and If the selected data copied from the hard drive needs to be restored back to the hard drive, accessing the storage resource to which the selected data was copied and restoring the selected data back to the hard drive.

2. A method for protecting data of a computer system having a hard drive with an operating system stored on a first partition thereof, comprising:

Copying the operating system from the first partition of the hard drive to a second partition of the hard drive and copying selected data from the hard drive to a remote location, wherein the second partition of the hard drive is hidden from a user of the computer system;

If a crash that prevents the computer system from booting from the operating system stored on the first partition of the hard drive occurs, booting the computer system from the copy of the operating system stored on the second partition of the hard drive; and If the selected data copied from the hard drive needs to be restored back to the hard drive, accessing the remote location to which the selected data was copied and restoring the selected data back to the hard drive.

3. A method for protecting data of a computer system having a hard drive with an operating system stored on a first partition thereof, comprising:

Copying the operating system from the first partition of the hard drive and selected data from at least one of the first partition of the hard drive and a third partition of the hard drive to a second partition of the hard drive, wherein the second partition of the hard drive is hidden from a user of the computer system;

If a crash that prevents the computer system from booting from the operating system stored on the first partition of the hard drive occurs, booting the computer system from the copy of the operating system stored on the second partition of the hard drive; and If the selected data copied from at least one of the first and third partitions of the hard drive needs to be restored back to at least one of the first and third partitions of the hard drive, accessing the second partition of the hard drive and restoring the selected data back to at least one of the first and third partitions of the hard drive.

4. A method for protecting data of a computer system having a hard drive with an operating system stored on a first partition thereof, comprising:

preparing the hard drive to define a second partition, the second partition being hidden from a user of the computer system;

copying the operating system from the first partition of the hard drive to the second partition and copying selected files from the hard drive to a backup location;

if a crash that prevents the computer system from booting from the operating system loaded on the first partition of the hard drive occurs, booting the computer system from the copy of the operating system stored on the second partition;

restoring the operating system loaded on the first partition of the hard drive with the copy of the operating system stored on the second partition; and if the selected files copied from the hard drive need to be restored back to the hard drive, performing the operations of:

calling a table of contents to determine the backup location of the selected files;

accessing the backup location having the selected files; and restoring the selected files back to the hard drive.

5. The method of claim 4, wherein the hard drive of the computer system is a first hard drive, and the backup location is selected from a group consisting of the second partition of the first hard drive, a second hard drive, a Zip® drive, a Jaz® drive, a CD-R drive, a CD-RW drive, a DVD-RW drive, a magneto-optical drive, a networked drive, a jukebox, a tape drive, and a storage resource connected to the Internet.

6. The method of claim 5, wherein the storage resource connected to the Internet is selected from a group consisting of a networked hard drive, a storage area network, a RAID array, and cluster server storage.

7. The method of claim 4, wherein the selected files copied to the backup location are copied from the first partition of the hard drive and a third partition of the hard drive.

8. The method of claim 7, wherein a drive letter of the first partition of the hard drive is C: and a drive letter of the third partition of the hard drive is D:.

9. The method of claim 4, wherein the selected files are selected from a group consisting of application files and user data files.

10. A computer readable media containing program instructions for protecting data of a computer system having a hard drive with an operating system stored on a first partition thereof, the computer readable media comprising:

Program instructions for copying the operating system from the first partition of the hard drive to a second partition of the hard drive and copying selected data from the hard drive to a backup location, wherein the second partition of the hard drive is hidden from a user of the computer system;

Program instructions for booting the computer system from the copy of the operating system stored on the second partition of the hard drive if a crash that prevents the computer system from booting from the operating system stored on the first partition of the hard drive occurs; and Program instructions for accessing the backup location to which the selected data was copied and restoring the selected data back to the hard drive if the selected needs to be restored back to the hard drive.

* * * * *